United States Patent [19]

Nomura et al.

[11] Patent Number: 5,312,869

[45] Date of Patent: May 17, 1994

[54] VULCANIZABLE RUBBER COMPOSITION

[75] Inventors: Akimasa Nomura, Zushi; Kazuyoshi Nakajima, Hoya, both of Japan

[73] Assignee: Nippon Zeon Co., Ltd., Tokyo, Japan

[21] Appl. No.: 37,432

[22] Filed: Mar. 26, 1993

[30] Foreign Application Priority Data

Mar. 27, 1992 [JP] Japan .................. 4-101683

[51] Int. Cl.$^5$ .............................................. C08F 8/00
[52] U.S. Cl. .................. 525/193; 525/221; 525/233
[58] Field of Search ................. 525/193, 221, 233

[56] References Cited

U.S. PATENT DOCUMENTS 4,713,409  12/1987  Hayes et al. .
4,918,144   4/1990  Fukuda .
4,983,678   1/1991  Saito et al. .
5,137,976   8/1992  Oberster et al. .

FOREIGN PATENT DOCUMENTS 0452488  10/1991  European Pat. Off. .

*Primary Examiner*—Bernard Lipman
*Attorney, Agent, or Firm*—Sherman and Shalloway

[57] ABSTRACT

There is provided a vulcanizable rubber composition comprising
  (a) 100 weight parts of a polymer component comprising 10 to 40 wt. % of an ethylenically unsaturated nitrile-conjugated diene highly saturated copolymer rubber wherein the content of the conjugated diene unit in the polymer chain is 30 wt. % or less and 90 to 60 wt. % of a polyethylenic polymer,
  (b) 10 to 80 weight parts of a metal salt of an ethylenically unsaturated carboxylic acid, and
  (c) 0.2 to 10 weight parts of an organic peroxide.

This composition gives a vulcanized rubber excellent not only in ozone resistance but in low temperature resistance and strength characteristics.

5 Claims, No Drawings

VULCANIZABLE RUBBER COMPOSITION

This invention relates to a vulcanizable rubber composition containing an ethylenically unsaturated nitrile-conjugated diene highly saturated copolymer rubber and a polyethylenic polymer. More detailedly, this invention relates to a vulcanizable rubber composition giving a vulcanized rubber excellent not only ozone resistance but low temperature resistance and strength characteristics.

Rubber used for automobile tires, belts, hoses, etc. are rubbers for general uses such as styrenebutadiene copolymer rubber (SBR), butadiene rubber (BR), chloroprene rubber (CR), isoprene rubber (IR) and natural rubber (NR). These rubbers for general uses are, usually, reinforced with carbon black, the tensile strength of the rubbers after vulcanization is large, and its upper limit reaches 300 kgf/cm² or more. However, these rubbers for general use have an unsaturated bond in the main chain of the polymer and are poor in weather resistance and ozone resistance.

Ethylene-propylene copolymer rubbers such as ethylene-propylene copolymer rubber (EPM) as a saturated rubber and ethylene-propylene-diene copolymer rubber (EPDM) having partly an unsaturated bond are excellent in weather resistance, particularly ozone resistance, heat resistance, etc. However, as for ethylene-propylene copolymer rubber, a reinforcement effect by carbon black is mush smaller, compared to the above general diene rubbers, and the upper limit of the tensile strength of compounded rubber is up to the other of 200 kdf/cm² and there is a limitation in development of uses in fields where high strength is required. For example, in bicycle tires made using EPM or EPDM as a raw material rubber, cracks due to ozone deterioration do not occur, but but cracks due to insufficient strength are liable to occur and thus their lives are extremely short.

Ethylenically unsaturated nitrile-conjugated diene highly saturated copolymer rubbers such as hydrogenated acrylonitrile-butadiene copolymer rubber are known as rubbers excellent in oil resistance and heat resistance. Further, it is known that a vulcanized rubber having excellent strength characteristics is obtained by compounding an ethylenically unsaturated carboxylic acid metal salt such as zinc dimethacrylate in such an ethylenically unsaturated nitrile-conjugated diene highly saturated copolymer rubber and making a crosslinkage with an organic peroxide (for example, U.S. Pat. No. 4,918,144 and European Patent No. 452,488). However, such vulcanized rubbers are insufficient in low temperature resistance and ozone resistance.

On the other hand, even when an ethylenically unsaturated carboxylic acid metal salt is compounded in general purpose EPM or EPDM and crosslinkage is made with an organic peroxide, there is a difficulty that a vulcanized rubber of high strength cannot be obtained, or in case strength characteristics increase in some extent, permanent set becomes too large.

It is proposed in U.S. Pat. No. 4,983,678 to obtain a vulcanized rubber excellent in ozone resistance and strength characteristics by compounding an ethylene-propylene copolymer rubber and zinc methacrylate in an ethylenically unsaturated nitrile-conjugated diene highly saturated rubber and making crosslinkage with an organic peroxide. However, this vulcanized rubber in insufficient in low temperature resistance. In this vulcanizable rubber composition, the ratio of the ethylenically unsaturated nitrile-conjugated diene highly saturated copolymer rubber in the rubber component is large and 90 to 60 wt. %, and the ratio of the ethylene-propylene copolymer rubber is small and 10 to 40 wt. %. According to the results of investigation by the present inventors, it was revealed that the low temperature resistance of the resultant vulcanized rubber does not make much difference compared to a case where an ethylenically unsaturated nitrile-conjugated diene highly saturated copolymer rubber is used solely as a rubber component.

Further, U.S. Pat. No. 4,713,409 discloses a composition containing a 50/50 (weight ratio) compounding matter of a nitrile rubber and EPDM, and zinc dimethacrylate, but the resultant vulcanized rubber is insufficient in low temperature resistance.

Further, U.S. Pat. No. 5,137,976 discloses a composition of a vulcanizable rubber selected from natural rubber and synthesized rubbers and an α,β-unsaturated carboxylic acid metal salt, but there is no specific reference to a composition wherein NBR, EPM or EPDM is used as the synthesized rubber.

The object of this invention lies in providing a vulcanizable rubber composition capable of giving a vulcanized rubber not only excellent in ozone resistance, but having a small permanent set excellent in low temperature resistance and strength characteristics.

The present inventors intensely studied for overcoming the above problems of prior art, and as a result found that a vulcanizable rubber composition comprising a polymer component comprising an ethylenically unsaturated nitrile-conjugated diene highly saturated copolymer rubber as a minor component and a polyethylenic polymer as a major component, a metal salt of an ethylenically unsaturated carboxylic acid and an organic peroxide gives a vulcanized rubber having excellent low temperature resistance and strength characteristics. The vulcanized rubber also has good ozone resistance and further has small permanent set and rubber elasticity is not spoiled.

From the viewpoint that the vulcanizable rubber composition of U.S. Pat. No. 4,983,678 is not substantially improved on low temperature resistance although it contains an ethylene-propylene copolymer rubber as a component and that it is disclosed in the U.S. Patent that the characteristics of the mixture composition are lost outside the range of the large compounding ratio of 90 to 60 wt. % of the ethylenically unsaturated nitrile-conjugated highly saturated copolymer rubber, it is an unexpected remarkable effect that the vulcanizable rubber composition of this invention are excellent in both of low temperature resistance and strength characteristics.

This invention was completed based on these finding.

Thus according to this invention is provided a vulcanizable rubber composition comprising
(a) 100 weight parts of a polymer component comprising 10 to 40 wt. % of an ethylenically unsaturated nitrile-conjugated diene highly saturated copolymer rubber wherein the content of the conjugated diene unit in the polymer chain is 30 wt. % or less and 90 to 60 wt. % of a polyethylenic polymer,
(b) 10 to 80 weight parts of a metal salt of an ethylenically unsaturated carboxylic acid, and
(c) 0.2 to 10 weight parts of an organic peroxide.

The ethylenically unsaturated nitrile-conjugated diene highly saturated copolymer rubber used in this invention includes a rubber obtained by hydrogenating the conjugated diene units of a copolymer rubber of an ethylenically unsaturated nitrile such as acrylonitrile, methacrylonitrile or α-chloroacrylonitrile with a conjugated diene such as 1,3-butadiene, isoprene, 1,3-pentadiene or 2,3-dimethyl-1,3-butadiene; a pluralistic copolymer rubber of the above two kinds of monomers and at least one of monomers copolymerizable therewith, which include, for example, vinyl aromatic compounds, (meth)acrylic acid, alkyl (meth)acrylates, alkoxyalkyl (meth)acrylates and cyanoalkyl (meth)acrylates; and a rubber obtained by hydrogenating the conjugated diene units of the pluralistic copolymer rubber.

The ethylenically unsaturated nitrile-conjugated diene highly saturated copolymer rubber is one which contains the ethylenically unsaturated nitrile monomer unit, usually, in the ratio of 10 to 60 wt. % and wherein the content of the conjugated diene unit is made to be 30 wt. % or less by partial hydrogenation of the conjugated diene unit or other means. When the content of the ethylenically unsaturated nitrile monomer unit is less than 10 wt. %, oil resistance is insufficient, and on the other hand, when it goes beyond 60 wt. %, there arises an inconvenience of lowering of elasticity. When the content of the conjugated diene unit goes beyond 30 wt. %, strength characteristics lower.

As specific examples of ethylenically unsaturated nitrile-conjugated diene highly saturated copolymer rubbers, there can be mentioned hydrogenated acrylonitrile-butadiene copolymer rubber, hydrogenated acrylonitrile-isoprene copolymer rubber, acrylonitrile-butadiene-acrylate copolymer rubber, hydrogenated acrylonitrile-butadiene-acrylate copolymer rubber, acrylonitrile-butadiene-acrylate-methacrylic acid copolymer rubber, hydrogenated acrylonitrile-butadiene-acrylate-methacrylic acid copolymer rubber, etc.

As polyethylenic polymers, there can be mentioned polyethylene, a copolymer of ethylene with an α-olefin, a ternary copolymer of ethylene, an α-olefin and a nonconjugated diene.

As the α-olefin is preferable at least one α-olefin having 3 to 6 carbon atoms such as propylene, 1-butene, 1-pentene or 1-hexene. The weight ratio of ethylene to an α-olefin, is usually, 90:10 to 20:80.

As non conjugated dienes, there can, for example, be mentioned dicyclopentadiene, methyltetrahydroindene, methylenenorbornene, 5-ethylidene-2-norbornene (hereafter, abbreviated as ENB), 1,4-hexadiene, etc. Among them, ENB and dicyclopentadiene are preferable. These nonconjugated dienes are used, usually, in the range of 10 mole % or less.

As specific examples of polyethylenic polymers, there can, for example, be mentioned low-density polyethylene, medium-density polyethylene, high-density polyethylene, extremely high molecular weight polyethylene, straight-chain low-density polyethylene, ethylene-propylene copolymer, ethylene-1-butene copolymer, ethylene-propylene-ENB ternary copolymer, blends of them, etc. The polyethylenic polymer can also be one obtained by copolymerizing another copolymerizable monomer such as an acrylate in a small quantity in a range not to spoil the object of this invention.

In this invention, as the polymer component is used a blend of an ethylenically unsaturated nitrileconjugated diene highly saturated copolymer rubber and a polyethylenic polymer. The ratio in the blend of the ethylenically unsaturated nitrile-conjugated diene highly saturated copolymer rubber is 10 to 40 wt. %, preferably 10 to 35 wt. %, and that of the polyethylenic polymer is 90 to 60 wt. %, preferably 90 to 65 wt. %. When the ratio of the ethylenically unsaturated nitrile-conjugated diene highly saturated copolymer rubber is too large, strength characteristics are improved but low temperature resistance lowers, and on the other hand the ratio is too small, strength characteristics lower. Further, when the ratio of the polyethylenic polymer is too small, low temperature resistance does not increase and ozone resistance lowers. In the range of the above ratio, all of ozone resistance, low temperature resistance and strength characteristics are improved.

Metal salts of ethylenically unsaturated carboxylic acids used in this invention are, for example, metal salts of unsaturated monocarboxylic acids such as acrylic acid, methacrylic acid, crotonic acid and 3-butenic acid; metal salts of unsaturated dicarboxylic acids such as maleic acid, fumaric acid and itaconic acid; metal salts of unsaturated dicarboxylic acid monoesters such as monomethyl maleate, monoethyl maleate and monoethyl itaconate; metal salts of unsaturated polyvalent carboxylic acids other than those listed above; metal salts of unsaturated polyvalent carboxylic acid esters having at least one free carboxyl group; etc.

As for metals, there is no particular limitation so long as they can form salts with the above ethylenically unsaturated carboxylic acids, but zinc, magnesium, calcium and aluminum are particularly suitable.

These metal salts of ethylenically unsaturated carboxylic acids can be compounded as such, and alternatively, it is also possible to add an ethylenically unsaturated carboxylic acid and a compound such as an oxide, hydroxide, carbonate or the like of such a metal to the polymer component and make them react in the polymer at the time of preparation of a vulcanizable rubber composition to form a metal salt in situ. However, when these compounds or metal salts are used, it is preferable to use those obtained by removing large particles, namely by making classification by a pneumatic classifier or the like to make the content of particles having a particle diameter of 20 μm or more 5 % or less.

Among these metal salts of ethylenically unsaturated carboxylic acids, zinc salt of methacrylic acid is particularly preferable because of its physical properties and easiness of obtention. When zinc salt of methacrylic acid is used, one is desirable obtained by reacting a zinc compound such as zinc oxide or zinc carbonate in the range of 0.5 to 3.2 moles, preferable 5 to 2.5 moles per 1 mole of methacrylic acid.

The ratio of the metal salt of an ethylenically unsaturated carboxylic acid is 10 to 80 weight parts, preferably 15 to 80 weight parts, more preferably 25 to 70 weight parts per 100 weight parts of the polymer component. When this ratio is less than 10 weight parts, desired strength cannot be obtained, and when it is above 80 weight parts, kneading becomes difficult.

As organic peroxides used in this invention, there can be used those used in usual vulcanization of rubber with peroxides. As specific examples, there can be mentioned dicumyl peroxide, ditertiary butyl peroxide, t-butyl cumyl peroxide benzoyl peroxide, 2,5-dimethyl-2,5-di(t-butylperoxy)hexine-3, 2,5-dimethyl-2,5-dibutylperoxy)-hexane, α,α'-bis(t-butylperoxy-m-isopropyl)benzene, etc. These organic peroxides are used solely or in combination of two or more of them. It is preferable to use an organic peroxide having a decomposition temperature as high as possible so as not to cause scorch at the time of kneading.

The ratio of the organic peroxide is 0.2 to 10 wt. parts, preferably 0.4 to 8 wt. parts per 100 weight parts of the polymer. When this ratio is below 0.2 wt. part or above 10 wt. parts, it is impossible to obtain a vulcanized rubber having a high strength and good physical properties.

It is possible to compound appropriately according to necessity in the vulcanizable rubber composition of this invention various chemicals, for example a reinforcer such as carbon black or silica; a filler such as calcium carbonate, or talc; a crosslinkage auxiliary such as triallyl isocyanurate, trimethylolpropane trimethacrylate or m-phenylenebismaleimide; a stabilizer; a coloring agent, in addition to the above respective components. Further, when a ternary copolymer of ethylene, an α-olefin and a nonconjugated diene is used, it is possible to use a sulfur vulcanization system together.

The vulcanizable rubber composition of this invention can be prepared by kneading those components using a usual mixer such as a roll, a banbury mixer or a kneader.

The order of mixing of these components is not particularly limited, but when the ethylene content of the polyethylenic polymer is about 65 weight % or more, it is preferable to prepare in advance a mixture of the ethylenically unsaturated nitrile-conjugated diene highly saturated rubber with the metal salt of the ethylenically unsaturated carboxylic acid, and then mix the mixture with the polyethylenic polymer. By adopting such mixing order, it is possible to obtain a composition wherein each component is dispersed uniformly, and therefore, the composition is excellent in the tensile strength and elongation of the vulcanized rubber compared to a case where a mixing order other than the above is adopted.

In mixing a mixture of the ethylenically unsaturated nitrile-conjugated diene highly saturated rubber with the metal salt of the ethylenically unsaturated carboxylic acid with the polyethylenic polymer, it is possible either to add the polyethylenic polymer to the mixture and mix them, or to add the mixture to the polyethylenic polymer and mix them.

When the ethylene content of the polyethylene polymer is under about 65 weight %, it is possible to obtain a composition wherein each component is dispersed uniformly, regardless of the order of kneading.

The organic peroxide is mixed, usually, after uniformal mixing of each component of the ethylenically unsaturated nitrile-conjugated diene highly saturated rubber, the polyethylenic polymer and the metal salt of the ethylenically unsaturated carboxylic acid, with the mixture, but as for an organic peroxide comparatively stable under the kneading conditions, it can be added at any time.

Other optional components such as a filler, a stabilizer and a crosslinkage auxiliary can be mixed, according to necessity, in any of the mixing steps of the respective components of the ethylenically unsaturated nitrile-conjugated diene highly saturated rubber, the polyethylenic polymer, the metal salt of the ethylenically unsaturated carboxylic acid and the organic peroxide.

This invention is specifically described below referring to examples and comparative examples, but not limited only to these examples. In these examples and comparative examples, part and % are based on weight basis unless otherwise defined.

Methods for tests of physical properties are as (1) Tension test

The following physical properties are measured by a tension test for vulcanized sheets in accordance with JIS K-6301.
  ① Tensile stress (100 % modulus $M_{100}$: Kgf/cm$^2$)
  ② Tensile strength ($T_B$: Kgf/cm$^2$)
  ③ Elongation at the time of rupture ($E_B$: %)
  ④ Permanent set (%)

(2) Hardness (Hs: JIS A)

Measured in accordance with JIS K-6301 (JIS hardness A).

(3) Gehman $T_{10}$ (° C.)

Measured in accordance with the low temperature torsion test of JIS K-6301.

(4) Ozone deterioration test

A vulcanized sheet was exposed in an ozone atmosphere and the presence of occurrence of cracks was observed.

<Test conditions>

Ozone concentration: 80 pphm
Elongation : 20%
Temperature: 40° C.
Test time 1,000 hours

EXAMPLES 1 TO 7 AND COMPARATIVE EXAMPLES 1 TO 6

Hydrogenated acrylonitrile-butadiene copolymer rubber (hydrogenated NBR: hydrogenation rate about 90%, acrylonitrile content about 37%) was used as the ethylenically unsaturated nitrile-conjugated diene highly saturated copolymer rubber, and various polymers disclosed in Table 1 were used as polyethylenic polymers.

The meanings of the symbols of the polyethylenic polymers shown in Table 1 are as follows.
(*1) EPM: ethylene-propylene copolymer (ethylene content 50 weight %)
(*2) EPM: ethylene-propylene copolymer (ethylene content 48 weight %)
(*3) EPM: ethylene-propylene copolymer (ethylene content 67 weight %)
(*4) EPDM: ethylene-propylene-ENB ternary copolymer (ethylene content 70 weight %, ENB content 6 weight %)

A blend was obtained, using an open mill, either by kneading 30 parts of zinc dimethacrylate into parts of a polymer component shown in Table 1 (Examples 1 to 5 and comparative examples 1 to 6), or by adding 20 parts of EPM shown in Table 1 to a blend of 80 parts of the ethylenically unsaturated nitrile-conjugated diene highly saturated copolymer rubber and 30 parts of zinc dimethacrylte and kneading the mixture (Examples 6 and 7) The α,α'-bis(t-butylperoxy-m-isopropyl)benzene (purity 40%) was added to this blend, and the mixture was kneaded. The resultant vulcanizable rubber composition was vulcanized at 180° C. for 15 minutes to obtain a vulcanized sheet having a thickness of 2 mm.

Prescribed dumbbels were punched out from this vulcanized sheet and used as specimens.

Physical properties of the resultant sheet were measured and the results were shown in Table 1 and Table 2.

TABLE 1

| | Example | | | | | | |
|---|---|---|---|---|---|---|---|
| | 1 | 2 | 3 | 4 | 5 | 6 | 7 |
| Compounding (part) | | | | | | | |
| EPM (*1) | 90 | 80 | 70 | 60 | — | — | — |
| EPM (*2) | — | — | — | — | 80 | — | — |
| EPM (*3) | — | — | — | — | — | 80 | — |
| EPDM (*4) | — | — | — | — | — | — | 80 |
| Hydrogenated NBR | 10 | 20 | 30 | 40 | 20 | 20 | 20 |
| Zinc dimethacrylate | 30 | 30 | 30 | 30 | 30 | 30 | 30 |
| Organic peroxide | 1.5 | 1.5 | 1.5 | 1.5 | 1.5 | 1.5 | 1.5 |
| Hardness $H_S$ (JIS A) | 67–63 | 68–64 | 69–64 | 70–65 | 61–59 | 75–75 | 78–76 |
| Tensile stress $M_{100}$ (Kgf/cm$^2$) | 22 | 25 | 26 | 28 | 22 | 35 | 42 |
| Tensile strength (Kgf/cm$^2$) | 285 | 318 | 340 | 360 | 297 | 370 | 390 |
| Elongation (%) | 530 | 560 | 550 | 540 | 580 | 500 | 390 |
| Gehman $T_{10}$ (°C.) | −52 | −50 | −43 | −35 | −52 | −45 | −44 |
| Permanent set (%) | 6 | 6 | 6 | 6 | 6 | 11 | 13 |
| Ozone deterioration test presence of cracks | No | No | No | No | No | No | No |

TABLE 2

| | Comparative example | | | | | |
|---|---|---|---|---|---|---|
| | 1 | 2 | 3 | 4 | 5 | 6 |
| Compounding (part) | | | | | | |
| EPM (*1) | 100 | — | — | — | 40 | — |
| EPM (*2) | — | 100 | — | — | — | — |
| EPM (*3) | — | — | 100 | — | — | — |
| EPDM (*4) | — | — | — | 100 | — | — |
| Hydrogenated NBR | — | — | — | — | 60 | 100 |
| Zinc dimethacrylate | 30 | 30 | 30 | 30 | 30 | 30 |
| Organic peroxide | 1.5 | 1.2 | 1.2 | 1.5 | 1.5 | 1.5 |
| Hardness $H_S$ (JIS A) | 66–62 | 59–58 | 76–75 | 71–70 | 74–70 | 73–69 |
| Tensile stress $M_{100}$ (Kgf/cm$^2$) | 24 | 19 | 32 | 40 | 30 | 31 |
| Tensile strength (Kgf/cm$^2$) | 247 | 231 | 353 | 303 | 413 | 562 |
| Elongation (%) | 480 | 730 | 520 | 350 | 540 | 570 |
| Gehman $T_{10}$ (°C.) | −54 | −56 | −49 | −48 | −26 | −25 |
| Permanent set (%) | 6 | 5 | 26 | 28 | 6 | 6 |
| Ozone deterioration test presence of cracks | No | No | No | No | No | Yes |

As apparent from the results of Table 1 and Table 2, it is seen that by blending EPM or EPDM with the partially hydrogenated NBR, strength as a drawback of EPM and EPDM is improved and moreover excellent low temperature resistance is brought about (Examples 1 to 7).

On the other hand, in case of sole use of EPM having a large ethylene content (Comparative example 3), although tensile strength is as high as 353 kg/cm$^2$, permanent set is as large as 26% and rubber elasticity tends to be spoiled, and thus such a case has a problem in practical use. In contrast thereto, when the EPM and the hydrogenated NBR were blended in a ratio of 80:20 (Example 6), tensile strength was further improved to 370 and at the same time permanent set is decreased to 11%, and thus both characteristics were enhanced.

Similarly, when EPDM was used alone (Comparative example 4), tensile strength of some extent was obtained, but permanent set is large. In contrast thereto, when the EPDM and the hydrogenated NBR were blended in a ratio of 80:20 (Example 7), tensile strength was remarkably improved and at the same time permanent set diminishes.

When the compounding ratio of the hydrogenated NBR was increased to 60 % (Comparative example 5), $T_{10}$ of Gehman low temperature torsion test got worse to be −26° C. This $T_{10}$ value is almost the same as in the case of sole use of the hydrogenated NBR (Comparative example 6). Namely, when the compounding ratio of the hydrogenated NBR becomes large, the role of the ethylenic polymer on low temperature resistance remarkably lowers. Therefore, it can be said that it is a remarkable effect incapable of being predicted from prior art that the vulcanizable rubber composition of this invention (Examples 1 to 7) have excellent low temperature resistance and excellent strength characteristics together.

As stated above, according to this invention, there can be provided a vulcanizable rubber composition capable of giving a vulcanized rubber not only excellent in ozone resistance, but having a small permanent set and excellent in low temperature resistance and strength characteristics. Therefore, the vulcanizable rubber composition of this invention can be utilized for uses for which usual EPM and EPDM have not been applicable, for example, belts, rolls, rubber vibration isolators, tires, etc.

What is claimed is:

1. A vulcanizable rubber composition comprising
 (a) 100 weight parts of a polymer component comprising 10 to 40 wt. % of an ethylenically unsaturated nitrile-conjugated diene highly saturated copolymer wherein the content of the conjugated diene unit in the polymer wherein the content of the conjugated diene unit in the polymer chain is 30 wt. % or less and 90 to 60 wt. % of a polyethylenic polymer selected from the group consisting of polyethylene, a copolymer of ethylene with an α-olefin, and a ternary copolymer of ethylene, an α-olefin and a non-conjugated diene,
 (b) 10 to 80 weight parts of a metal salt of an ethylenically unsaturated carboxylic acid, and (c) 0.2 to 10 weight parts of an organic peroxide.

2. A vulcanizable rubber composition comprising
   (a) 100 weight parts of a polymer component comprising 10 to 35 wt. % of an ethylenically unsaturated nitrile-conjugated diene highly saturated copolymer rubber wherein the content of the conjugated diene unit in the polymer chain is 30 wt. % or less and 90 to 65 wt. % of a polyethylenic polymer selected from the group consisting of polyethylene, a copolymer of ethylene with an α-olefin, and a ternary copolymer of ethylene, an α-olefin and a non-conjugated diene,
   (b) 10 to 80 weight parts of a metal salt of an ethylenically unsaturated carboxylic acid, and
   (c) 0.2 to 10 weight parts of an organic peroxide.

3. A process for preparation of a vulcanizable rubber composition comprising
   (a) 100 weight parts of a polymer component comprising 10 to 40 wt. % of an ethylenically unsaturated nitrile-conjugated diene highly saturated copolymer rubber wherein the content of the conjugated diene unit in the polymer chain is 30 wt. % or less and 90 to 60 wt. % of a polyethylenic polymer selected from the group consisting of polyethylene, a copolymer of ethylene with an α-olefin, and a ternary copolymer of ethylene, an α-olefin and a non-conjugated diene,
   (b) 10 to 80 weight parts of a metal salt of an ethylenically unsaturated carboxylic acid, and
   (c) 0.2 to 10 weight parts of an organic peroxide which comprises a step to prepare in advance a mixture containing the ethylenically unsaturated nitrile-conjugated diene highly unsaturated copolymer rubber and the metal salt of the ethylenically unsaturated carboxylic acid, and a step to mix the mixture with the polyethylene polymer.

4. A process for preparation of a vulcanizable rubber composition comprising
   (a) 100 weight parts of a polymer component comprising 10 to 40 wt. % of an ethylenically unsaturated nitrile-conjugated diene highly saturated copolymer rubber wherein the content by the conjugated diene unit in the polymer chain is 30 wt. % or less and 90 to 60 wt. % of a polyethylenic polymer selected from the group consisting of polyethylene, a copolymer of ethylene with an α-olefin, and a ternary copolymer of ethylene, an α-olefin and a non-conjugated diene,
   (b) 10 to 80 weight parts of a metal salt of an ethylenically unsaturated carboxylic acid, and
   (c) 0.2 to 10 weight parts of an organic peroxide, which comprises mixing in advance the ethylenically unsaturated nitrile-conjugated diene highly saturated copolymer rubber with the metal salt of the ethylenically unsaturated carboxylic acid, mixing the mixture with the polyethylenic polymer, and then adding thereto the organic peroxide and mixing the mixture.

5. The process for preparation of a vulcanizable rubber composition according to claim 3 or 4 wherein the ethylene unit content of the polyethylenic polymer is about 65 weight % or more.

* * * * *